US005687010A

United States Patent [19]
Van Tilborg et al.

[11] Patent Number: 5,687,010
[45] Date of Patent: Nov. 11, 1997

[54] DUAL MOTION SCANNING METHOD AND APPARATUS THEREFOR

[75] Inventors: Cornelis Van Tilborg, Baarlo; Yue Peng, Venlo; Eduardus Josephus Willibrordus Van Vliembergen, Ax Venlo; Gerardus Gertruda Johannes Catharina Kessels, An Venlo; Jacobus Johannes Kandelaars, Gs Bergen, all of Netherlands

[73] Assignee: Oce-Technologies, B.V., MA Venlo, Netherlands

[21] Appl. No.: 601,850

[22] Filed: Feb. 15, 1996

[30] Foreign Application Priority Data

Feb. 15, 1995 [EP] European Pat. Off. ............. 95200363
Feb. 20, 1995 [EP] European Pat. Off. ............. 95200406

[51] Int. Cl.⁶ ............................................. H04N 1/04
[52] U.S. Cl. ................ 358/496; 358/488; 358/498; 399/396
[58] Field of Search ................. 358/474, 486, 358/488, 494, 496, 497, 498; 355/233, 234, 235, 50, 51, 208, 214; 399/370, 371, 372, 200, 202, 205, 211, 212, 389, 396, 386; H04N 1/04

[56] References Cited

U.S. PATENT DOCUMENTS

| | | | |
|---|---|---|---|
| 3,754,822 | 8/1973 | Melrose | 355/8 |
| 4,611,903 | 9/1986 | Fukushi | 355/14 |
| 4,803,561 | 2/1989 | Kubota . | |
| 5,231,513 | 7/1993 | Yokobori et al. . | |
| 5,241,346 | 8/1993 | Ide et al. | 355/235 |
| 5,280,368 | 1/1994 | Fullerton | 358/496 |
| 5,444,555 | 8/1995 | Ono | 358/494 |

OTHER PUBLICATIONS

"Patent Abstracts of Japan", vol. 18, No. 657, (P-1842), Dec. 13, 1994 & JP-A-62, 058724, (Fuji Xerox Co., Ltd.), Sep. 16, 1994.

Primary Examiner—Kim Vu

[57] ABSTRACT

A scanner device, and the method it embodies, for scanning a document. The scanning includes a pre-scan and a subsequent main scan, with the pre-scan generating data related to the document. The scanner device includes: a scanning assembly having a platen against which the document is positioned and a mobile portion movable along the platen; a document moving device for moving a document in a first direction onto the platen; a mobile-portion-moving device for moving the mobile portion of the scanning assembly in a second direction opposite to the first direction; and a controller for controlling the document moving device and the mp-moving device, and for controlling the scanning assembly to scan the document while the document and the portion of the scanning assembly are both moving. This, for example, substantially reduces instances in which the mobile portion is moving without scanning taking place. When incorporated into a copier device, the controller controls the mobile-portion-moving device and the scanning assembly to perform a main scan as a function of the pre-scan. Such a copier has a reproducing device for reproducing a document based upon an image generated during the main scan.

28 Claims, 6 Drawing Sheets

DUAL MOTION SCANNING METHOD AND APPARATUS THEREFOR

BACKGROUND OF INVENTION

1. Technical Field of Invention

The invention relates to a method of scanning a document with an image sensor provided with means for observing a substantially linear area of a platen, said area being movable across said platen in a direction substantially perpendicular to said area, wherein a pre-scan is performed while the document is being conveyed onto said platen, and a subsequent main scan is performed by moving the image sensor relative to the platen. The invention further relates to a scanning apparatus employing such a method and a digital copying apparatus including said scanning apparatus.

2. Description of Related Art

In a digital copier or an electronic image processing system, a document, e.g., a sheet of paper provided with image information thereon, is normally scanned-in by moving the area observed by an image sensor, which may for example be formed by a line array of ccd-elements mounted on a movable carriage and provided with a so-called strip lens, or mounted in a stationary position and provided with a movable mirror-and-lens-system (commonly known), across a transparent platen on which the document is deposited. The analogue image data sampled by the image sensor are converted into digital data and are then subjected to further processing such as binarization, half-tone processing, colour processing and the like. For an optimal setting of the processing parameters, such as threshold values and the like, it is frequently desired that histogram-data reflecting the density distribution of the image on the document are known beforehand. To this end, a so-called pre-scan is performed, in which these histogram-data are sampled. Such a pre-scan may also be used for detecting the format of the document and/or its position on the platen.

In a conventional scanning apparatus, which is described for example in U.S. Pat. No. 4,803,561, the pre-scan is performed by moving the image sensor in a first direction while the document rests on the platen, and the main scan is performed while the image sensor travels back to the initial position. Normally, a comparatively coarse image resolution is sufficient for sampling the histogram-data, and the travelling speed of the image sensor during the pre-scan may therefore be higher than during the main scan. However, as the image sensor and the carriage on which it is mounted may have a considerable mass of inertia, the speed of travel of the image sensor can in practice not be increased beyond a certain limit, and when a larger number of documents are to be scanned one after the other, the time required for the pre-scan of each individual document leads to an undesirable reduction of the throughput, i.e., the frequency at which the successive documents can be scanned.

U.S. Pat. No. 5,231,513 discloses a scanning method and apparatus in which the pre-scan is performed already while the document is being conveyed onto the platen by means of an automatic document feeder (ADF). Here, the image sensor is held stationary at the entry side of the platen, and the histogram-data are sampled while the document is moved past the image sensor. When the document sheet has been fed completely and rests on the platen, the main scan is performed in the usual manner by moving the image sensor to the opposite side of the platen. When the main scan is completed, the image sensor is moved back in the opposite direction without data being sampled. The next scan cycle cannot be started before the image sensor has reached again its rest position at the entry side of the platen. Thus, the throughput of the scanning apparatus is limited due to the time required for moving the image sensor back into the rest position.

SUMMARY OF INVENTION

It is an object of the invention to reduce the time required for a complete pre-scan and main scan cycle for a given maximum speed of conveyance of the document and a given maximum speed of travel of the area observed by the image sensor.

According to the invention, this object is achieved by moving the area observed by the image sensor relative to the platen in a direction opposite to the conveying direction of the document, while the pre-scan is being performed.

Thus, the operations of conveying the document onto the platen, sampling the histogram-data in the pre-scan and returning the area observed by the image sensor to the start position for the main scan can all be executed simultaneously, so that the total time required for these operations can be reduced significantly. In particular, it is not necessary to wait until the area observed by the image sensor has reached a certain position before a new document can be fed, nor is it necessary to wait with the start of the pre-scan until the document has reached its final position on the platen. Since, during the pre-scan, the area observed by the image sensor and the document move in opposite directions relative to the platen, the pre-scanning speed of the area observed by the image sensor relative to the document is as high as the sum of the speed of travel of the area observed by the image sensor and the speed of conveyance of the document, so that the pre-scan can be accomplished within a short time.

In general, the speed of conveyance of the document will be selected to be as high as practical, and the speed at which the area observed by the image sensor is moved during the pre-scan will be the maximum possible speed or any suitable speed which, in view of the document speed and the given sampling frequency of the image sensor provides the desired resolution or line pitch for the histogram-data.

When a job consisting of a number of documents is scanned, the area observed by the image sensor may be moved back and forth over the entire length of the platen. Then, the length of the individual document sheets of the job may vary at random, provided of course that the document length does not exceed the length of the platen.

As is generally known in the art, the cover of the platen, e.g., a conveyor belt of the document feeder, may have a surface with a specific colour or reflectivity, so that the image sensor is capable of distinguishing between light that has been reflected or scattered at this surface and the light received from the area of the document. Then, the format and the position of the document may be derived from the data sampled during the pre-scan, and only the image data sampled within the boundary of the document sheet will be processed as histogram-data.

In a preferred embodiment, however, at least one edge detector is provided at the entry side of the platen, so that the leading edge (and the trailing edge) of a fed document can be detected before the edge meets the area observed by the image sensor during the pre-scan. As is usual in the art, the position of the conveyor belt of the document feeder is constantly measured, and the information provided by this edge detector can be used for relating the positions of the document and of the conveyor belt. On the basis of this relation, the positions of the leading and trailing edges of the document can be tracked with high accuracy, because any possible slippage of the document sheet taken from the stack and conveyed through the upstream portion of the document feeder will not contribute to the position tolerances. Thus, in spite of the high relative speed of the area observed by the image sensor and the document during the pre-scan, the positions where the leading edge and the trailing edge of the document sheet meet the moving area observed by the image sensor can be determined with sufficient precision, so that data may be sampled only during the time when the image sensor actually scans the document sheet.

The information provided by the edge detector may also be used for controlling the document feeder such that the document is moved to a desired position on the platen. Especially in the case that the document feeder is provided with a reversing loop for processing duplex documents (i.e., document sheets provided with image information on both sides), it is preferable (in terms of throughput) that either the leading edge or the trailing edge of the document is always brought to a predetermined position (termed zero-position hereinafter) on the platen, irrespective of the length of the sheet. The zero-position would be adjacent to the side of the platen on which the reversing loop of the feeder is provided, so that the distance which the document sheet has to travel when being reversed is kept as small as possible.

Preferably, the document feeder is so arranged that new document sheets taken from the stack and reversed sheets coming out of the reversing loop are conveyed onto the platen from the same side, i.e., the side adjacent to the zero-position. Then, the start position of the area observed by the image sensor for the main scan will always substantially coincide with the zero-position, and the position where the area observed by the image sensor is stopped at the end of the main scan will depend on the length of the document sheet. This position will also be the starting position for the next pre-scan. Since the vast majority of jobs to be processed will consist of document sheets of the same length, the area observed by the image sensor will normally start from a suitable position for pre-scanning the next document without delay.

Information on the length of the document sheet may be derived from the signal of the above-mentioned edge detector located close to the zero-position or from any other suitable source. If this information is available well before the end of the pre-scan, it is possible to reduce the time required for the scan cycle to a minimum by adjusting the speed of travel of the area observed by the image sensor such that it will reach the zero-position in the very moment when the trailing edge of the document also reaches the zero-position, and the movements of the area observed by the image sensor and the document sheet are stopped almost simultaneously.

In order to provide the information on the length of the document sheet in due time, another edge detector may be provided in the upstream portion of the document feeder. If the information on the length of the document is not available or becomes available too late, which may be the case when the document sheet is very long, then either the movement of the area observed by the image sensor or that of the document sheet will be stopped before the end of the pre-scan, depending on whether the area observed by the image sensor or the trailing edge of the document is the first to reach the zero-position.

It will be noticed that the relative speed of the area observed by the image sensor and the document sheet will not in all cases be constant over the entire pre-scan. If the sampling frequency of the image sensor is fixed, then the resolution in sub-scanning direction, i.e., the pitch of the scan lines, will also be variable in the course of the pre-scan. In most cases, this will not seriously affect the utility of the histogram-data sampled in this way. If desired, the sampling frequency of the image sensor may however be adjustable in response to variations of the relative speed, so that the histogram-data are always sampled with a constant line pitch.

The objects of the present invention are fulfilled by providing a method of scanning a document in a scanning device, the scanning device including a scanning assembly having a platen against which the document is positioned and a mobile portion movable along the platen, the scanning including a pre-scan and a subsequent main scan, the pre-scan generating data related to the document, the method comprising the steps of: a) moving a first document in a first direction onto the platen; b) moving the mobile portion of the scanning assembly in a second direction opposite to the first direction; and c) scanning the document while the document and the mobile portion of the scanning assembly are both moving. This, for example, substantially reduces instances in which the mobile portion is moving without scanning taking place.

The objects of the present invention also are fulfilled by providing a scanner apparatus for scanning a document, the scanning including a pre-scan and a subsequent main scan, the pre-scan generating data related to the document, the apparatus comprising: a scanning assembly having a platen against which the document is positioned and a mobile portion movable along the platen; document moving means for moving a document in a first direction onto the platen; mobile-portion-moving ("mp-moving") means for moving the mobile portion of the scanning assembly in a second direction opposite to the first direction; and a controller for controlling the document moving means and the mp-moving means, and for controlling the scanning assembly to scan the document while the document and the portion of the scanning assembly are both moving.

The objects of the present invention also are fulfilled by providing a copier apparatus for reproducing a document via scanning, the scanning including a pre-scan and a subsequent main scan, the pre-scan generating data related to the document, the apparatus comprising: a scanning assembly having a platen against which the document is positioned and a mobile portion movable along the platen; document moving means for moving a document in a first direction onto the platen; mp-moving means for moving the mobile portion of the scanning assembly in a second direction opposite to the first direction; a controller for controlling the document moving means and the mp-moving means, and for controlling the scanning assembly to pre-scan the document while the document and the portion of the scanning assembly are both moving, wherein the controller controls the mp-moving means and the scanning assembly to perform a main scan as a function of the pre-scan; and reproducing means for reproducing a document based upon an image generated during the main scan.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein . . .

DETAILED DESCRIPTION OF PREFERRED EMBODIMENTS

Figure 1:
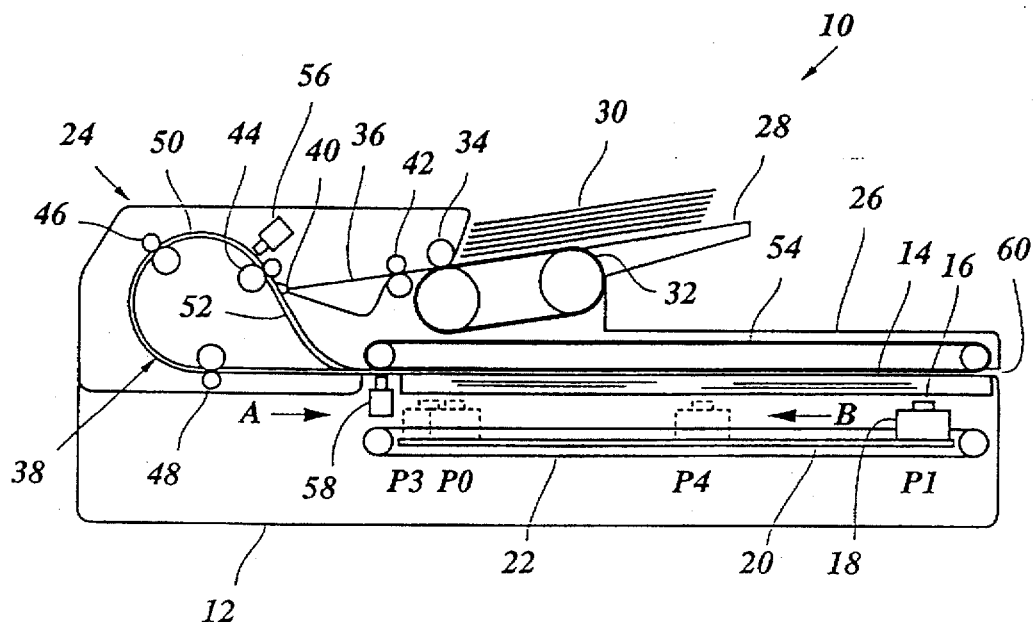
FIG. 1 is a schematic cross-sectional view of a scanning apparatus suitable for carrying out the method according to the invention.

The scanning apparatus 10 shown in FIG. 1 has a frame 12 provided with a transparent platen 14 on which documents to be scanned can be deposited. An image sensor 16 mounted on a carriage 18 is arranged underneath the platen 14.

As is known in the art, the image sensor 16 comprises exposure lamps for illuminating the surface of the document through the platen, and a line array of light sensitive semiconductor elements such as ccd-elements which detect the light scattered or reflected at the surface of the document. The image sensor 16 substantially spans the entire width of the platen 14 in the direction perpendicular to the plane of the drawing in FIG. 1, so that an entire image line can be sampled in one sampling period.

The carriage 18 is movable along guide rails 20 which extend in parallel with the lengthwise direction of the platen 14 and is driven for example by a cable-and-pulley arrangement 22 which itself is driven by an electric motor such as a step motor or the like (not shown). The movement of the carriage along the guide rails 20 is monitored in a conventional manner, for example by counting pulses of the step motor or pulses of a suitable pulse generator coupled with the drive system.

An automatic document feeder (ADF) 24 has a casing 26 which serves as a cover for the platen 14 and is pivotally connected to the frame 12 so that it may be tilted into an open position when documents shall be placed manually on the platen 14.

The ADF 24 has a document tray 28 accommodating a stack of document sheets 30. A separating conveyor 32 cooperates with a separating roller 34 and is arranged to take-up the sheets 30 one by one from the bottom of the stack and to feed them into a feeding path 36. The ADF 24 is arranged for handling both simplex and duplex documents and is accordingly provided with a reversing loop 38 which is connected to the downstream end of the feeding path 36 at a junction 40. The feeding path 36 and the reversing loop 38 are formed by guide plates and a number of pairs of drive rollers 42, 44, 46 and 48 among which the drive roller pairs 44 and 46 can be driven in both directions. The reversing loop 38 is made up of a first section 50 contiguous with the feeding path 36 and a second section 52 which forms an acute angle with the feeding path 36. Both sections 50 and 52 smoothly adjoin the entry side of the platen 14 where the documents are taken over by a belt conveyor 54. The conveyor belt 54 is porous and a vacuum is applied at the back side of the section of the belt facing the platen 14, so that the grip of the belt 54 on a document is increased by sucking action.

A first edge detector 56 is arranged at the reversing loop 38 in a position close to the junction 40, and a second edge detector 58 is arranged within the frame 12 right at the entry side of the platen 14.

Simplex documents are fed into the first section 50 of the reversing loop 38 until their trailing edge has passed the first edge detector 56. The edge detector 56 detects the passages of the leading edge and the trailing edge of this document sheet, so that its length can be calculated from the signals of the detector and the known conveying speed in the reversing loop.

Then, the direction of transport of the drive rollers 44 and 46 is reversed, and the document is conveyed onto the platen 14 via the second section 52 of the reversing loop 38 and the conveyor belt 54. The second edge detector 58 detects at least the passage of the leading edge of the document. The movement of the conveyor belt 54 is monitored in a similar manner as has been described above in conjunction with the movement of the carriage 18, so that the position of the document on the platen 14 can accurately be controlled on the basis of the signal from the detector 58 and the position of the conveyor belt.

The simplex documents are oriented face-down in the document tray 28, so that their image side will face the image sensor 16 when they are conveyed onto the platen 14.

When a first document sheet has, on its way to the platen, left the first section 50 of the reversing loop, a subsequent document sheet may already be fed into the first section 50 of the reversing loop and, when the second section 52 thereof has been cleared as well, into that second section, where it is kept in a stand-by position with its leading edge being located at a short distance upstream of the second edge detector 58 against a mechanical stopper (not shown). When the scan cycle is completed, the conveyor belt 54 is driven again to transport the document sheet towards a discharge slot 60 while the subsequent document is simultaneously conveyed onto the platen. This procedure assures that the gaps between the successive document sheets can be kept comparatively small and a high throughput can be achieved.

When the document sheets 30 are duplex documents, they are placed on the tray 28 with their respective first page facing downward. In this case, the direction of transport of the document sheets supplied through the feeding path 36 is not reversed in the first section 50 of the reversing loop 38. Instead, the document sheets are directly conveyed through the first section 50 to the platen 14 where the second page on the backside of the document sheet is scanned. Then, the conveyor belt 54 is driven in reverse direction and the document sheet is passed through the reversing loop 38 in clockwise direction so that it is again conveyed onto the platen 14, but this time through the second section 52 thereby causing its first page (front side) to face downward. While this side of the document sheet is being scanned, the next sheet is supplied into the first section 50 of the reversing loop 38. When the first document sheet has been processed, it is discharged and the second sheet can be processed without delay.

When the duplex document sheets are successively discharged through the slot 60 and are dropped onto the top of a stack (not shown), they will be collated in the same orientation and sequence as on the document tray 28.

Figure 2:
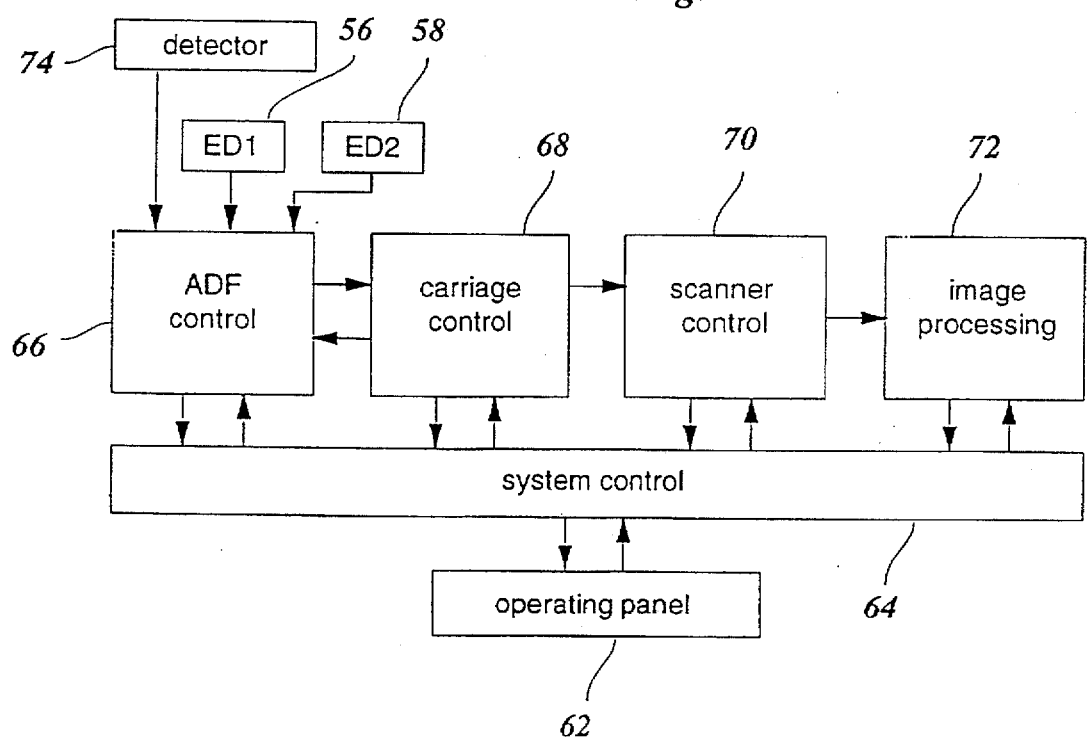
FIG. 2 is a block diagram of a control system of a scanning apparatus according to the invention.

A control system of the above described scanning apparatus 10 will now be explained with reference to FIG. 2.

An operating panel 62, which may be provided on the frame 12, comprises several operating buttons (not shown), among others a start button and a mode selector for selecting the duplex mode or the simplex mode, and is connected to a system control unit 64 which may be formed by a microcomputer. The system control unit 64 communicates with an ADF control unit 66 controlling the operation of the ADF 24, a carriage control unit 68 controlling the movements of the carriage 18, a scanner control unit 70 and an image processing unit 72. These units may be implemented as software for the microcomputer forming the system control unit, but can also be formed by separate hardware devices. The scanner control unit 70 controls the operation of the image sensor 16, especially the timings at which the sampling of data begins and ends, and the line sampling frequency, and transmits the sampled image data to the image processing unit 72 where the image information is further processed and stored. The first edge detector 56 (ED1) and the second edge detector 58 (ED2) are both connected to the ADF control unit 66.

The ADF control unit 66 is further connected to a detector 74 which may be incorporated in the document tray 28 and detects the presence of at least one document sheet 30 as well as the width thereof. As is generally known, a width detector may be formed by optical sensors or by position sensors coupled to movable guide plates (not shown) which engage the lateral edges of the document sheets 30 and can manually be adjusted to the width of the documents. On the basis of the signal from the detector 74 the ADF control unit 66 determines the width of the documents and sends a corresponding signal to the scanner control unit 70, via the system control unit 64, so that the active region of the image sensor may be limited to the actual width of the document.

In an operating method of the apparatus according to a first embodiment of the invention, the ADF is adapted to measure the length of the document sheets 30 and this information is used to control the prescanning procedure.

In the simplex mode, the ADF control unit 66 determines the length of the document sheets on the basis of the signals from the first edge detector 56. The ADF control unit may also receive the signal from the second edge detector 58. In the duplex mode, it is preferable that the length of the document sheets is determined from the timing at which the leading edge reaches the second edge detector 58 and the timing at which the trailing edge passes the first edge detector 56. The ADF control unit 66 further uses the signal from the second edge detector 58 as a reference point for monitoring the movement of the document sheet on the platen 14, when the sheet is driven by the conveyor belt 54.

The scanning process will now be described by reference to FIGS. 1 and 3. As an example, it is assumed that two simplex documents are to be scanned.

Figure 3:
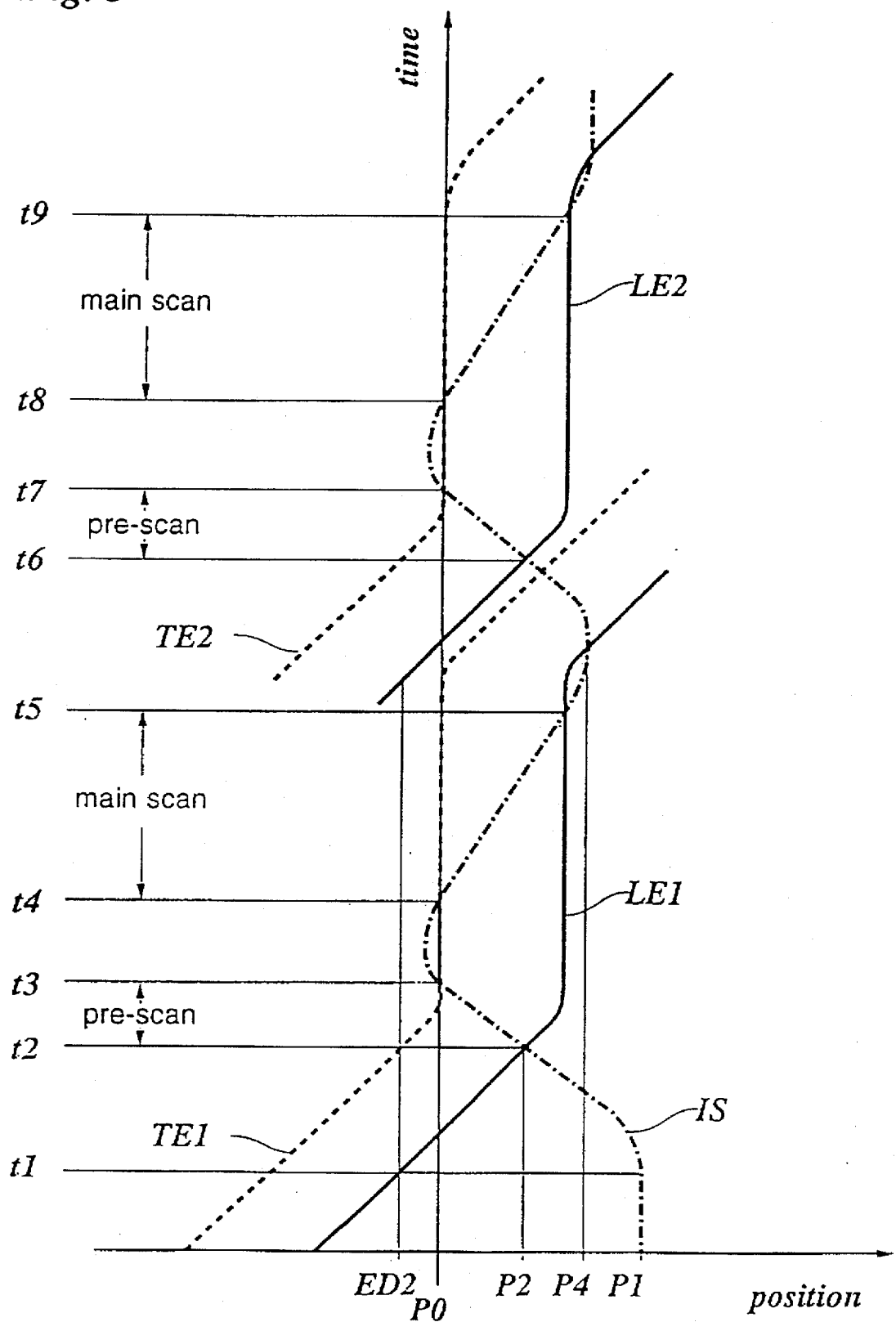
FIG. 3 is a displacement/time diagram illustrating the method according to a first embodiment of the invention.

In FIG. 3, the curve IS indicates the movement of the image sensor 16. The curves LE1 and TE1 indicate the movements of the leading edge and the trailing edge, respectively, of the first document sheet, and the curves LE2 and TE2 indicate the movements of the leading edge and the trailing edge of the second sheet.

Initially, the carriage 18 is held in the position P1 adjacent to the discharge side of the platen 14. The first document sheet is conveyed onto the platen 14 in the direction A (FIG. 1). When, at the time t1, the leading edge LE1 reaches the second edge detector 58 (ED2), the carriage control unit 68 causes the carriage 18 to move in the direction B, i.e., opposite to the direction of conveyance of the document sheet. After a short acceleration phase, the carriage 18 will be moved at a constant speed.

At the time t2, the leading edge LE1 and the image sensor meet each other at the position P2 and the prescan starts.

At the time t3, the conveyor belt 54 is stopped, so that the document sheet is held stationary on the platen with its trailing edge TE1 coinciding with a predefined zero-position P0 on the entry side of the platen 14, close to the edge detector 58 (ED2). The image sensor 16 (IS) reaches the position P0 at the same time t3, and the pre-scan is completed. The image sensor is decelerated, and its direction of movement is reversed at a position P3 (FIG. 1). When the image sensor reaches again the zero-position P0 at the time t4, it has achieved the desired speed for the main scan. This speed is kept constant throughout the main scan, while the document sheet is held stationary. When the image sensor reaches the leading edge LE1 at the time t5, the main scan is completed and the image sensor is decelerated immediately and brought to a stop at a position P4 close to the position of the leading edge of the document sheet. Concurrently, the conveyor belt is accelerated again, and the first document sheet is discharged while the second one is supplied. Without delay, the carriage 18 is driven in the direction B, and the process described above is repeated for conducting the pre-scan (between t6 and t7) and the main scan (between t8 and t9) for the second document sheet. These cycles may be repeated for an arbitrary number of document sheets.

In the given example it has been assumed that the document sheets all have the same length (as will usually be the case). It will be appreciated that, after the time t5, the image sensor is not returned to the initial position P1 but is kept at the position P4 which is close to the leading edge of the document when the same rests on the platen. This has the advantage that the next scan cycle can be started without delay. Accordingly, the intervals between the successive document sheets can be made small, so that a maximum throughput is achieved.

In the shown embodiment, the time required for the very first scan cycle is somewhat larger because the image sensor starts from the position P1. This time can be reduced further by starting the movement of the image sensor as soon as the length of the document sheet has been detected, i.e., earlier than t1. At that moment, the time t3 at which the trailing edge will reach P0 can also be estimated, and the carriage speed is calculated so that it will meet the trailing edge at position P0. When the leading edge passes the second edge detector 58 and the position of the document sheet becomes known with higher accuracy, the carriage speed may be corrected in order to make sure that the image sensor meets the trailing edge of the document exactly at the position P0.

In case of duplex documents, the scanning process is essentially the same as in FIG. 3. The main difference will be that the time interval between the scan cycle for the backside of the document (first scan) and the scan cycle for the front side (second scan) will be slightly longer because the document sheet must be passed through the reversing loop 38.

Figure 4:
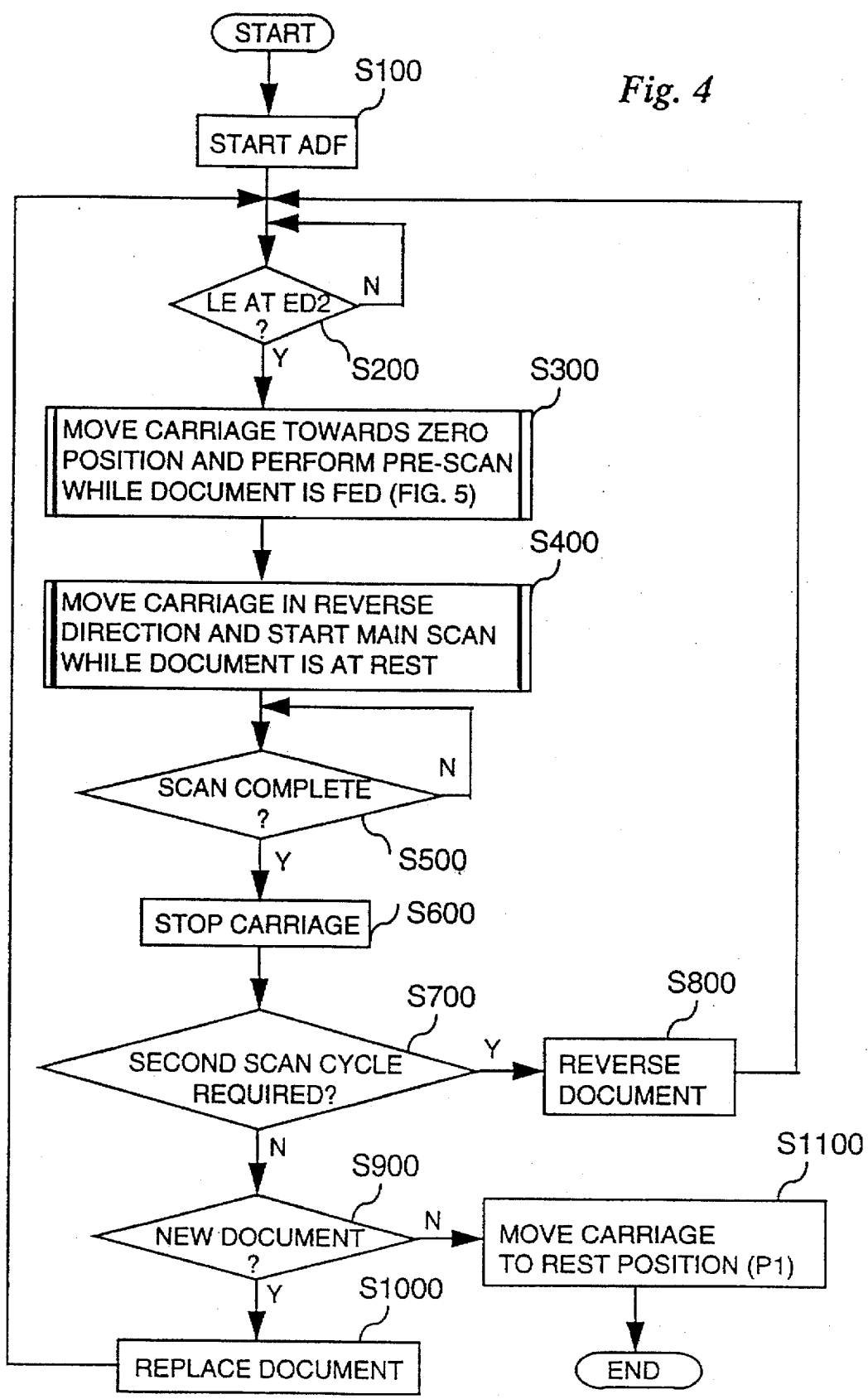
FIGS. 4 and 5 are flow charts for explaining the method according to FIG. 3.

The operation of the control system shown in FIG. 2 will now be described in greater detail by reference to FIGS. 4 and 5.

When a job of document sheets has been placed on the document tray 28 and the start buffon on the operating panel 62 is depressed, the ADF 24 is started in order to convey the first document sheet onto the platen 14 via either the first section 50 or the second section 52 of the reversing loop 38, depending on whether the simplex mode or duplex mode has been selected (step S100). In the simplex mode and, if possible, also in the duplex mode, the ADF control unit 66 determines the length of the document sheet, using the signals from the edge detector 56 and (in the duplex mode) also from the second edge detector 58. During the entire job, the ADF will constantly check, whether there are document sheets present in the document tray 28, and, if so, feed a new document into a stand-by position just in front of edge detector 58 as soon as it has delivered a simplex document or the second side of a duplex document to the belt conveyor 54.

In step S200, it is checked whether the leading edge (LE) of the document has reached the second edge detector 58 (ED2), and the carriage control unit 68 enters into a waiting loop until it receives the signal from the second edge detector 58 (ED2).

Then, in step S300, the carriage control unit 68 triggers the movement of the carriage 18 from its rest position P1 towards the zero-position P0. Meanwhile, the leading part of the document sheet is grasped by the conveyor belt 54, and the sheet keeps moving at constant speed, so that the document sheet and the image sensor are moved past one another in opposite directions and the pre-scan can be performed.

Figure 5:
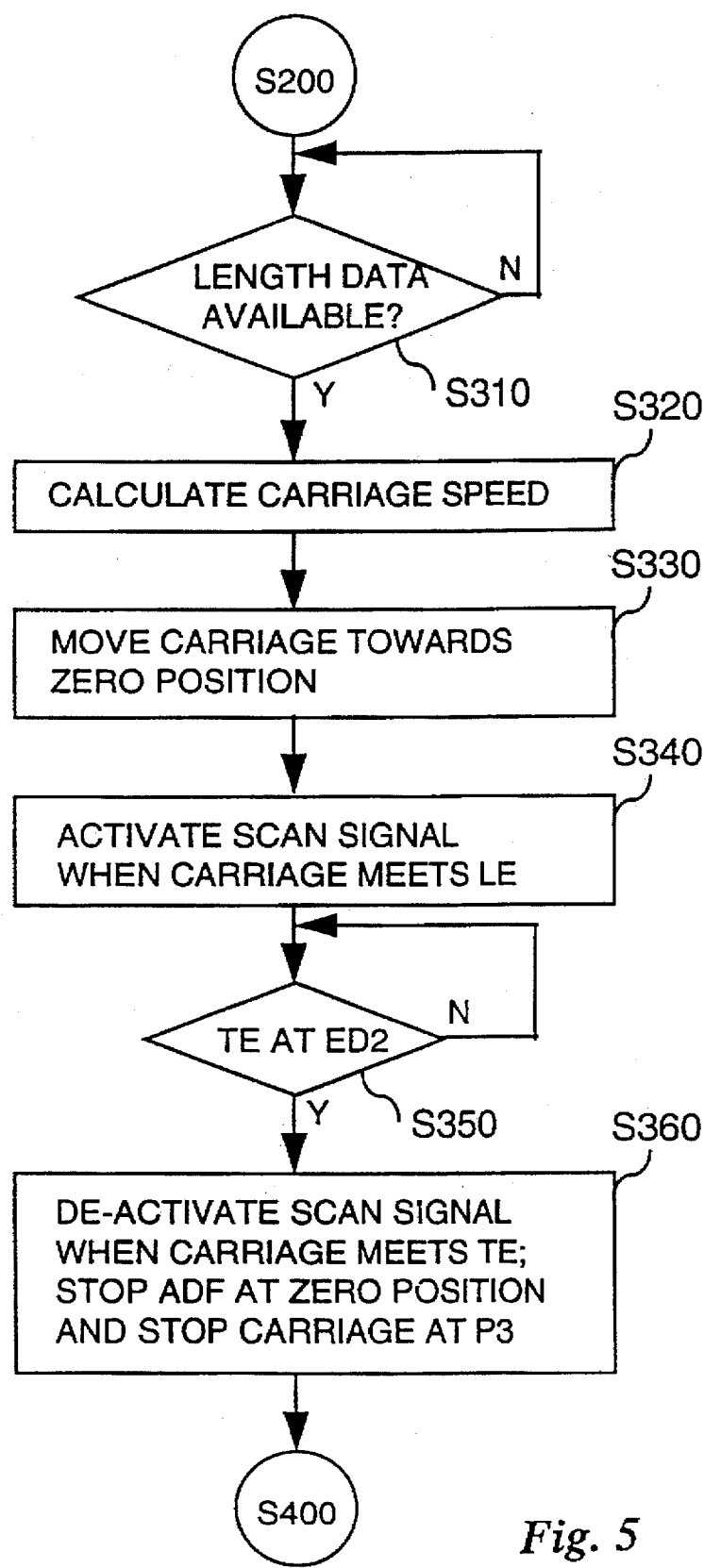

The details of the control procedure involved in the step S300 are illustrated in FIG. 5.

In step S310, the carriage control unit 68 checks whether the information on the length of the document sheet is already available. This will be the case if the simplex mode is selected or if the length of the document sheet is smaller than the distance between the first and second edge detectors 56, 58. If none of these conditions is fulfilled, the control unit enters into a waiting loop.

Otherwise, the carriage control unit 68 calculates the speed at which the carriage has to be moved in order for the image sensor 16 to reach the zero-position P0 concurrently with the trailing edge of the document sheet. To this end, the length of the time interval between t1 and t3 is calculated from the length of the document sheet and the known speed at which the same is conveyed, a correction for the deceleration of the document sheet at the end of its movement being taken into account. Then, the obtained time interval is used for calculating the required speed on the basis of the distance between the known actual position of the carriage and the zero-position P0. Here, a correction is made for the initial acceleration of the carriage.

In step S330, the carriage is accelerated and is then moved towards the zero-position with the calculated speed. While the carriage and the leading edge of the document move towards each other, their respective positions are monitored and at the moment they meet (t2), the carriage control unit 68 delivers a scan signal to the scanner control unit 70, so that the pre-scan is started (S340). This scan signal may be slightly delayed in order to make sure that, in spite of possible tolerances, the image sensor will only sample data from within the area of the document sheet.

In step S350, the carriage control unit 68 checks the second edge detector 58 (ED2) until the trailing edge (TE) of the document sheet has passed. The pre-scan is meanwhile being continued. When the trailing edge of the sheet passes edge detector 58 (ED2), the following actions are taken in order to stop the pre-scanning as well as the feeding of the document sheet (step 360).

When the trailing edge of the sheet meets the image sensor 14, the scan signal is de-activated.

The signal of edge detector 58 is transmitted to the ADF control unit and is used there to decelerate the conveyor belt 54 such that the trailing edge of the sheet will stop at the zero-position P0.

When the carriage reaches the zero-position P0, it is decelerated until it stops at position P3 (FIG. 1) slightly beyond the zero-position P0.

The pre-scan being completed, the image data sampled are now processed in order to calculate the processing parameters for the main scan and the results are transmitted to the image processing unit.

The carriage 18 is then immediately accelerated again in the reverse direction A (FIG. 1), so that it reaches the desired speed for the main scan when arriving at the zero-position P0, and then the main scan is performed while the document rests on the platen (step S400).

As soon as the image sensor has been displaced from the zero-position P0 over a distance equal to the length of the document sheet, the carriage 18 is decelerated so that it stops, at position P4 (steps S500 and S600).

Then, in step S700, it is checked whether the scan just ended was the first one of a duplex document. If this was the case, the document is reversed in the reversing loop 38 for scanning the second side in step S800. The scanning of the second side starts at step S200 of the procedure.

If there is no second scan to be made of the document, it is in step S900 checked whether there is a new document waiting at the stand-by position near the platen. If this is the case, this new document is fed onto the platen, while, with the same movement of the conveyor belt, the previous document sheet is conveyed towards the discharge slot 60 (step S1000). The procedure now loops back to step S200.

If there is no new document waiting, which means that end of the job has been reached, the carriage is moved back to the rest position P1 (step S1100).

In the embodiment described above, the speed of the carriage 18 during the pre-scan is calculated on the basis of the length of the document which has been measured beforehand. If the start position for the first scan cycle is properly adjusted to the length of the document sheet, then the pattern of relative movement of the image sensor and the document sheet will be the same for all document sheets of the job.

Figure 6:
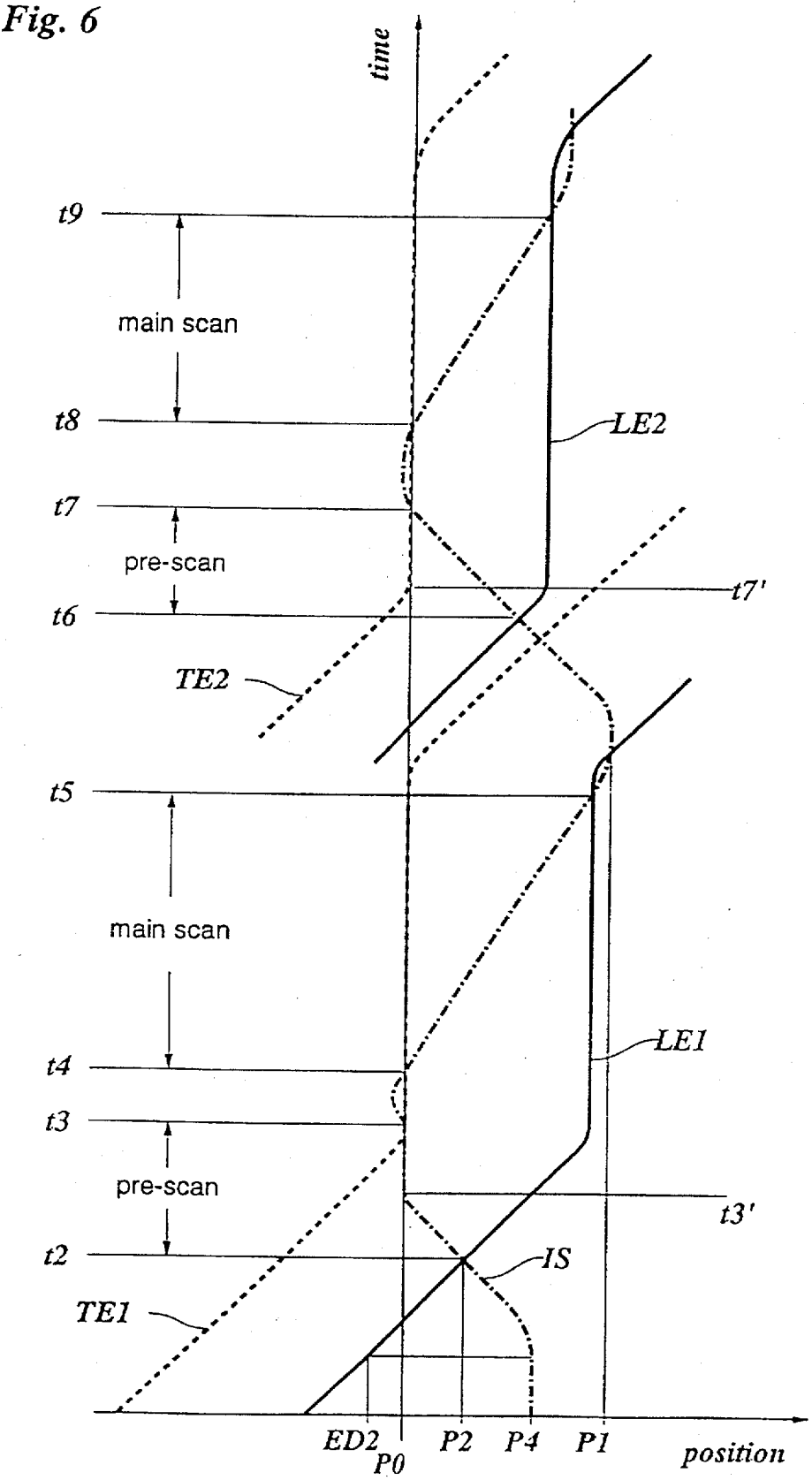
FIG. 6 is a displacement/time diagram illustrating a second embodiment of the invention.
Figure 7:
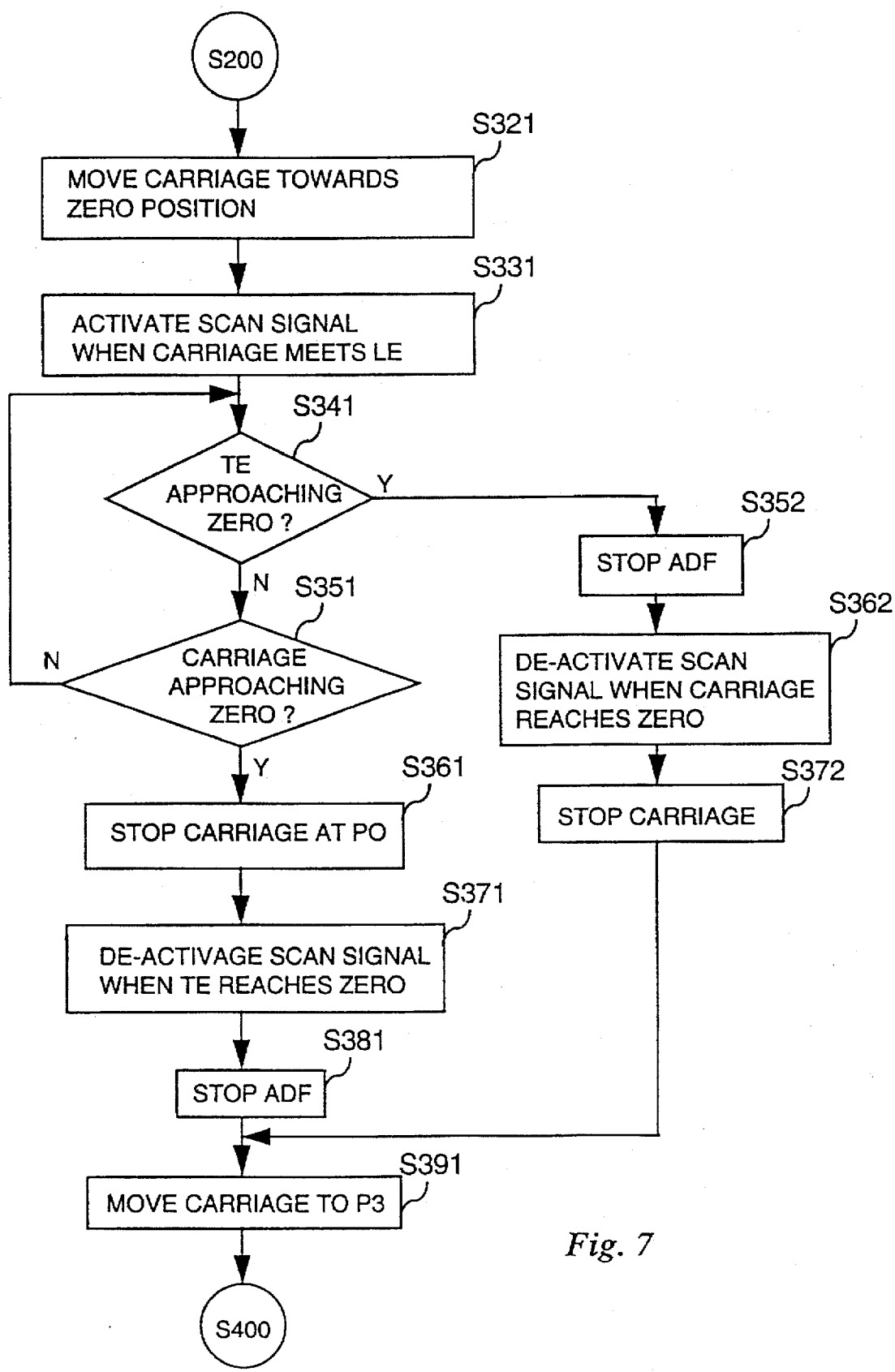
FIG. 7 is a flow chart for explaining the embodiment according to FIG. 6.

FIGS. 6 and 7 illustrate a second embodiment in which the signal from the first edge detector 56 is not utilized. In this case, it is not possible to measure the length of the document in time for calculating a translation speed for the scanner carriage 18 which would insure that the carriage and the trailing edge of the document reach position P0 at the same time. Instead, in this embodiment, it is assumed that every document has the same length as its predecessor in the job, and special measures are taken in the event that this is not the case. Further, the scanning process goes off in exactly the same way as in the first embodiment, as is explained herein above with reference to FIG. 4. For the first document of a job, the length cannot in any way be determined, and therefore it is assumed to have the maximal length accepted for the apparatus. If this document appears to be shorter, the procedure as described below for mixed jobs is adopted. Because the vast majority of jobs have documents with uniform lengths, all following documents of the job are handled in an optimal way, that is, the way according to the first embodiment of the invention, since the assumption that each document has the same length as its predecessor is correct. If, however, the job contains documents of different lengths (mixed job), a procedure as described below is adopted.

FIG. 6 illustrates the processing of a mixed job in which the individual (simplex) document sheets have different lengths. In this example, a comparatively short document sheet has been scanned already and the image sensor has been stopped in the position P4. When the edge detector ED2 signals the passage of the leading edge LE1 of the next sheet, which, in this example, is longer than the previous one, the image sensor is moved with a preselected speed as calculated on the basis of the assumption that the document currently being fed has the same length as the previous one.

The time t2 when the pre-scan begins can be determined in the same manner as in the first embodiment. However, the time t3 at which the trailing edge TE1 reaches the zero-position P0 is not yet known. Since the new sheet is longer than expected, the image sensor IS would reach the zero-position P0 at a time t3' while the document sheet is still moving. The image sensor is decelerated and stopped at position P0, and the pre-scan is continued with a smaller relative speed, i.e., the speed of conveyance of the document sheet.

Based on the passage of the trailing edge TE1 at the edge detector ED2, the document sheet is decelerated and stopped (at the time t3) in a position where its trailing edge coincides with the zero-position P0. At this instant the pre-scan is completed, and the scanner carriage is now moved to its main scan starting position P3.

The length of the sheet can now be calculated on the basis of the signal from the edge detector 58 and the speed of the conveyor belt 54. The main scan is then performed in the same manner as has been described above. At the end of the main scan the image sensor has reached a position corresponding to the length of the current document sheet. This position may be P1, if the sheet has the largest admissible length.

The next document sheet, which has again a smaller length, is supplied immediately, and the image sensor is moved towards the zero-position, so that the next pre-scan begins at t6. However, since this sheet is rather short, its trailing edge TE2 reaches the zero-position P0 already at a time t7' when the image sensor is still moving. The pre-scan is accordingly continued with a smaller relative speed which in this case is equal to the speed of travel of the image sensor. The pre-scan ends at t7 when the image sensor reaches the zero-position. The main scan is then performed in the usual manner.

In the given example, the time period during which the image sensor and the document sheet are being moved in opposite directions is only a fraction of the total pre-scan period. However, this applies only to the exceptional case that the length of a document is different from that of its predecessor. In the normal case, when all sheets have the same length, both the image sensor and the sheet will be moving substantially throughout the whole pre-scan period, just as in the first embodiment. This is due to the fact that the position from which the image sensor starts at the beginning of a new scan cycle always corresponds to the stationary position of the leading edge of the previous sheet, and that the speed of the image sensor during the pre-scan is equal to the speed at which the document sheet is conveyed.

FIG. 7 is a flow chart which corresponds to that of FIG. 5 and illustrates the second embodiment.

In step S321, the carriage is moved towards the zero-position P0 at a fixed speed. When the carriage meets the leading edge of the sheet (at time t2), the scan signal is activated in step S331, and the image sensor 16 starts sampling the histogram-data.

While the image sensor and the document sheet are moved in opposite directions, it is repeatedly checked in steps S341 and S351 whether the trailing edge of the sheet has passed the edge detector ED2 or whether the carriage reaches a specific position near the zero-position P0. If the second one of these events occurs earlier, the carriage is stopped at position P0 in step S361. The document sheet keeps moving until it is detected, in step S371, that the trailing edge has passed the edge detector ED2. Then, the scan signal is de-activated (step S371) and the document sheet is decelerated until it stops with its trailing edge coinciding with the zero-position P0 (step S381). At this instant, the pre-scan is completed. Next, the carriage is moved to position P3 in step S391. The routine then proceeds to the step S400 in FIG. 4.

If it is detected in step S341 that the trailing edge of the sheet reaches the zero-position earlier than the image sensor, then the sheet is stopped in step S352 in a similar manner as in step S381. When the image sensor reaches the zero-position, the scan signal is de-activated (step S362) and the carriage is also stopped (step S372). The pre-scan thus being completed, the routine proceeds to step S391, and the carriage is moved to position P3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of scanning a document in a scanning device, the scanning device including a scanning assembly having a platen against which the document is positioned and a mobile portion movable along the platen, the scanning including a pre-scan and a subsequent main scan, the pre-scan generating data related to the document, the method comprising the steps of:

a) moving a first document in a first direction onto the platen;

b) moving the mobile portion of the scanning assembly in a second direction opposite to the first direction; and c) pre-scanning the document while the document and the mobile portion of the scanning assembly are both moving.

2. A method as in claim 1, wherein:

the steps a), b), and c) are coordinated relative to a point in time, t1, at which a leading edge of the document enters onto the platen.

3. A method as in claim 1, wherein the step a) includes:

a1) stopping the document when a trailing edge thereof reaches a predetermined position P0 on the platen.

4. A method as in claim 3, wherein the method further comprises:

d) moving the mobile portion of the scanning assembly, during the main scan and while the document is at rest, along the first document from the position P0;

e) stopping, at the end of the main scan, the mobile portion of the scanning assembly at a position P4 substantially corresponding to the leading edge of the first document; and f) selecting position P4 as the starting position for movement of the mobile portion of the scanning assembly during the next pre-scan.

5. A method as in claim 3, wherein the step b) includes:
b1) determining the length of the document before the trailing edge of the document reaches the platen; and
b2) modifying a speed of the mobile portion as a function of the length of the document so that the mobile portion of the scanning assembly and the trailing edge of the document reach the position P0 at substantially the same time.

6. A method as in claim 3, wherein:
the step b) includes:
b1) moving the portion of the scanning assembly towards the position P0;
wherein, if the trailing edge of the document reaches the position P0 before the mobile portion of the scanning assembly, then the step c) includes:
c1) pre-scanning until the mobile portion of the scanning assembly reaches the position P0; and
wherein, if the mobile portion of the scanning assembly reaches the position P0 before the trailing edge of the document, then the step c) includes:
c2) pre-scanning until the trailing edge of the document reaches the position P0.

7. A method as in claim 1, wherein:
the document is moved at a first constant speed; and
wherein the mobile portion of the scanning assembly is moved at a second constant speed.

8. A method as in claim 1, wherein:
the document is moved at a first speed;
wherein the mobile portion of the scanning assembly is moved at a second speed;
wherein the pre-scanning is performed at a relative scanning speed that is a combination of the first and second speeds;
wherein the scanning assembly has a sampling frequency;
wherein the step c) includes:
c1) adjusting the sampling frequency as a function of the relative scanning speed.

9. A scanner apparatus for scanning a document, the scanning including a pre-scan and a subsequent main scan, the pre-scan generating data related to the document, the apparatus comprising:
a scanning assembly having a platen against which the document is positioned and a mobile portion movable along the platen;
document moving means for moving a document in a first direction onto the platen;
mobile-portion-moving means for moving the mobile portion of the scanning assembly in a second direction opposite to the first direction; and
a controller for controlling the document moving means and the mobile-portion-moving means, and for controlling the scanning assembly to pre-scan the document while the document and the portion of the scanning assembly are both moving.

10. An apparatus as in claim 9, wherein:
the controller coordinates the document moving means, the mobile-portion-moving means, and the scanning relative to a point in time, t1, at which a leading edge of the document enters onto the platen.

11. An apparatus as in claim 9, wherein:
the document moving means stops the document when a trailing edge thereof reaches a predetermined position P0 on the platen.

12. An apparatus as in claim 11, wherein:
the mobile-portion-moving means moves the mobile portion of the scanning assembly, during the main scan, along the first document from the position P0;
wherein the mobile-portion-moving means stops, at the end of the main scan, the mobile portion of the scanning assembly at a position P4 substantially corresponding to the leading edge of the first document; and
wherein the controller selects the position P4 as the starting position for movement of the mobile portion of the scanning assembly by the mobile-portion-moving means during the next pre-scan.

13. An apparatus as in claim 11, further comprising:
determination means for determining the length of the document before the trailing edge of the document reaches the platen;
wherein the controller modifies a speed of the mobile portion as a function of the length of the document so that the mobile-portion-moving means moves the mobile portion of the scanning assembly to reach the position P0 at substantially the same time as the trailing edge of the document.

14. An apparatus as in claim 11, wherein:
the mobile-portion-moving means moves the mobile portion of the scanning assembly towards the position P0;
wherein, if the trailing edge of the document reaches the position P0 before the mobile portion of the scanning assembly, then the controller causes the pre-scanning to continue until the mobile portion of the scanning assembly reaches the position P0; and
wherein, if the mobile portion of the scanning assembly reaches the position P0 before the trailing edge of the document, then the controller causes the pre-scanning to continue until the trailing edge of the document reaches the position P0.

15. An apparatus as in claim 9, wherein:
the document moving means moves the document at a first constant speed; and
wherein mobile-portion-moving means moves the mobile portion of the scanning assembly at a second constant speed.

16. An apparatus as in claim 9, wherein:
the document moving means moves the document at a first speed;
wherein the mobile-portion-moving means moves the mobile portion of the scanning assembly at a second speed;
wherein the pre-scanning is performed at a relative scanning speed that is a combination of the first and second speeds;
the scanning assembly has a sampling frequency;
the apparatus further comprising:
adjusting means for adjusting the sampling frequency as a function of the relative scanning speed.

17. An apparatus as in claim 9, further comprising:
reverse loop means, arranged at an end of the platen, for reversing a document such that both sides of the document can be scanned in subsequent scan cycles; and
edge detector means, arranged near the same end of the platen as the reverse loop means, for detecting at least one of the leading edge and the trailing edge of the document.

18. An apparatus as in claim 9, further comprising:
length detector means for detecting the length of the document prior to the document coming to rest on the platen.

19. A copier apparatus for reproducing a document via scanning, the scanning including a pre-scan and a subsequent main scan, the pre-scan generating data related to the document, the apparatus comprising:

a scanning assembly having a platen against which the document is positioned and a mobile portion movable along the platen;

document moving means for moving a document in a first direction onto the platen;

mobile-portion-moving means for moving the mobile portion of the scanning assembly in a second direction opposite to the first direction;

a controller for controlling the document moving means and the mobile-portion-moving means, and for controlling the scanning assembly to pre-scan the document while the document and the portion of the scanning assembly are both moving, wherein the controller controls the mobile-portion-moving means and the scanning assembly to perform a main scan as a function of the pre-scan; and reproducing means for reproducing a document based upon an image generated during the main scan.

20. A copier apparatus as in claim 19, further comprising:

reverse loop means, arranged at an end of the platen, for reversing a document such that both sides of the document can be scanned in subsequent scan cycles; and edge detector means, arranged near the same end of the platen as the reverse loop means, for detecting at least one of the leading edge and the trailing edge of the document.

21. A copier apparatus as in claim 19, further comprising:

length detector means for detecting the length of the document prior to the document coming to rest on the platen.

22. A copier apparatus as in claim 19, wherein:

the controller coordinates the document moving means, the mobile-portion-moving means, and the scanning relative to a point in time, t1, at which a leading edge of the document enters onto the platen.

23. A copier apparatus as in claim 19, wherein:

the document moving means stops the document when a trailing edge thereof reaches a predetermined position P0 on the platen.

24. A copier apparatus as in claim 23, wherein:

the mobile-portion-moving means moves the mobile portion of the scanning assembly, during the main scan, along the first document from the position P0;

wherein the mobile-portion-moving means stops, at the end of the main scan, the mobile portion of the scanning assembly at a position P4 substantially corresponding to the leading edge of the first document; and wherein the controller selects the position P4 as the starting position for movement of the mobile portion of the scanning assembly by the mobile-portion-moving means during the next pre-scan.

25. A copier apparatus as in claim 23, further comprising:

determination means for determining the length of the document before the trailing edge of the document reaches the platen;

wherein the controller modifies a speed of the mobile portion as a function of the length of the document so that the mobile-portion-moving means moves the mobile portion of the scanning assembly to reach the position P0 at substantially the same time as the trailing edge of the document.

26. A copier apparatus as in claim 23, wherein:

the mobile-portion-moving means moves the mobile portion of the scanning assembly towards the position P0;

wherein, if the trailing edge of the document reaches the position P0 before the mobile portion of the scanning assembly, then the controller causes the scanning to continue until the mobile portion of the scanning assembly reaches the position P0; and wherein, if the mobile portion of the scanning assembly reaches the position P0 before the trailing edge of the document, then the controller causes the scanning to continue until the trailing edge of the document reaches the position P0.

27. A copier apparatus as in claim 19, wherein:

the document moving means moves the document at a first constant speed; and wherein mobile-portion-moving means moves the mobile portion of the scanning assembly at a second constant speed.

28. A copier apparatus as in claim 19, wherein:

the document moving means moves the document at a first speed;

wherein the mobile-portion-moving means moves the mobile portion of the scanning assembly at a second speed;

whereby the scanning is performed at a relative scanning speed that is a combination of the first and second speeds;

the scanning assembly has a sampling frequency;

the apparatus further comprising:

adjusting means for adjusting the sampling frequency as a function of the relative scanning speed.

* * * * *